Dec. 17, 1968    F. O. MILLER    3,416,194
MOLD CLAMPING AND SEALING CONSTRUCTION
Filed Oct. 7, 1966
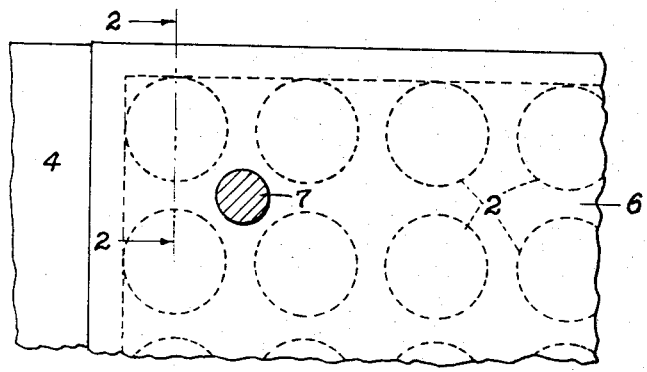
FIG.1.
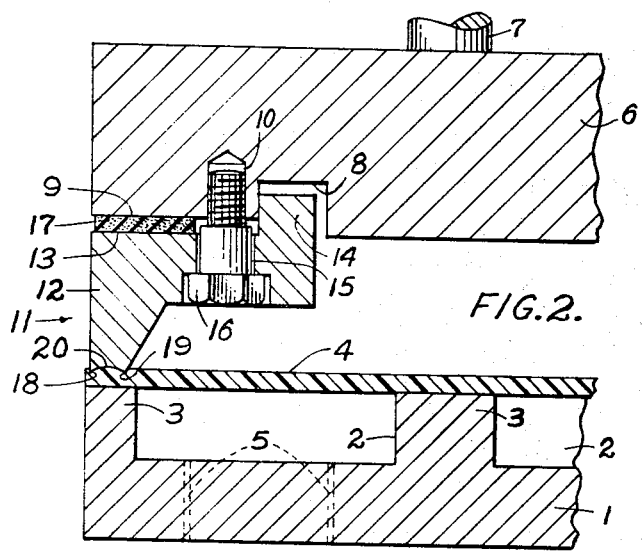
FIG.2.
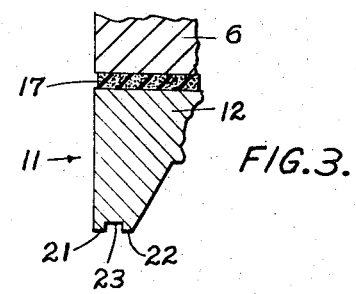
FIG.3.
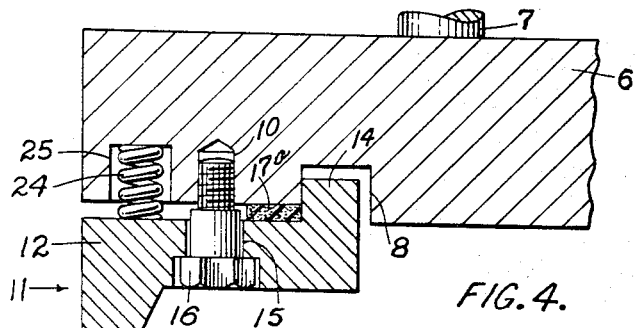
FIG.4.
INVENTOR.
FREDERICK O. MILLER
BY
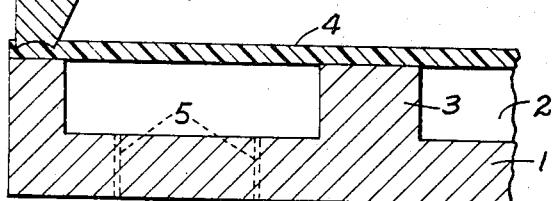

United States Patent Office 3,416,194
Patented Dec. 17, 1968

3,416,194
MOLD CLAMPING AND SEALING
CONSTRUCTION
Frederick O. Miller, Saginaw, Mich., assignor to Miller
Mold Co., Saginaw, Mich., a corporation of Michigan
Filed Oct. 7, 1966, Ser. No. 585,004
9 Claims. (Cl. 18—35)

This invention relates to a mold construction and more particularly to a mold construction especially adapted for use in the differential pressure forming of plastics.

In the molding of plastic articles, it is common to introduce a sheet of hot, pliable plastic between first and second mold members, actuate at least one of the members to clamp the plastic sheet therebetween, and deform the plastic sheet so as to produce a molded article. The molding may be accomplished by vacuum or positive pressure processes with or without plug assists. In any event, it is necessary that the periphery of the mold be in sealing engagement with the plastic sheet so as to prevent the leakage of air or other gas.

It has been common practice heretofore to provide at least one of the mold parts with a rubber or rubber-like gasket that is adapted to engage one surface of the plastic sheet and form a seal. The use of such a gasket is objectionable for several reasons. For example, the gasket absorbs heat from the hot plastic sheet and becomes distorted, brittle, or both. In addition, the gasket sometimes fails to provide an airtight seal between itself and the mold member on which it is supported, and this kind of failure may be accelerated by the distortion and brittleness caused by its absorption of heat. Moreover, it is not uncommon for the exposed edge of the gasket to become pitted, torn and ragged, thereby preventing it from providing an effective seal against the plastic material.

An object of this invention is to provide a mold construction which overcomes the disadvantages referred to above.

Another object of the invention is to provide a mold construction having two halves or parts between which material to be molded may be clamped effectively and in which the periphery of the mold may be maintained in airtight, sealed relation with the material to be molded.

A further object of the invention is to provide a mold construction of the character referred to and in which the means for effecting sealing of the perimeter of the mold is protected from the heat of the material being molded.

Another object of the invention is to provide a mold construction having deformable means which is yieldable to achieve secure clamping of the material to be molded and which at the same time functions to effect an airtight seal at the perimeter of the mold.

Other objects and advantages of the invention will be pointed out specifically or will become apparent from the following description when it is considered in conjunction with the appended claims and the accompanying drawings, in which:

FIGURE 1 is a fragmentary, top plan view of a mold constructed in accordance with the invention and illustrating a sheet of plastic material extending into the mold;

FIGURE 2 is an enlarged, fragmentary sectional view taken on the line 2—2 of FIGURE 1;

FIGURE 3 is a view similar to FIGURE 2 and illustrating a modification of the invention; and FIGURE 4 is a view similar to FIGURE 2 and illustrating another modification of the invention.

Apparatus constructed in accordance with the invention disclosed in FIGURES 1 and 2 comprises a first generally rectangular mold member or base 1 having a plurality of cavities 2 therein between which are ribs 3 the upper surfaces of which form a supporting surface for a sheet 4 of plastic material such as polyethylene, polypropylene, or the like, which is to be molded. In communication with each cavity 2 there may be provided passages 5 and through which air or other gas may pass so as selectively to evacuate or pressurize the cavity.

Overlying the mold member 1 is a second generally rectangular mold member 6 and which may be raised and lowered by means of a plurality of rods 7 that may be secured to suitable lifting and lowering means (not shown). Adjacent each edge of the mold member 6 the under surface thereof is provided with a groove 8, the adjacent surface of the member 6 outboard of the groove 8 being flat as is indicated at 9. Also outboard of the groove 8, but closely adjacent thereto, is a plurality of tapped openings 10.

Between the mold members 1 and 6 is a rectangular clamping member 11 comprising a body 12 having a flat surface 13 adjacent and parallel to the surface 9 and terminating at its inboard end in an upstanding rib or flange 14 which is loosely received in the groove 8. The body 12 is provided with a plurality of counterbored openings 15 in each of which is loosely accommodated a headed bolt 16, the threaded shank of which is threaded into the corresponding opening 10. Between the surfaces 9 and 13 is a deformable, relatively incompressible gasket or seal member 17 formed of rubber or heat resistant rubber-like material such as neoprene or the like.

The lower surface of the body member 12, at the outboard side of the latter, is provided with a shaped, sheet engaging surface which, in the form shown in FIGURE 2, comprises a pair of spaced apart, parallel, co-planar, relatively sharp edges 18 and 19 spaced from one another by an arcuate, downwardly concave groove 20.

To condition the apparatus shown in FIGURES 1 and 2 for operation, the bolts 16 may be threaded into the openings 10 so as to cause a compressive stress or preload to be exerted on the gasket 17 by the members 6 and 11. The bolts 16 should not be threaded into the openings 10 to such an extent as to preclude further movement of the members 6 and 11 toward one another. The member 6 then may be supported in spaced, vertical relation above the member 1 so as to enable the sheet 4 of material to be introduced between the members 1 and 6. Thereafter, the member 6 may be lowered so as to enable the edges 18 and 19 of the clamp member 11 to engage the upper surface of the member 4.

The capacity of the raising and lowering means for the member 6, or the weight of the latter, should be such that the edges 18 and 19 of the clamping member will be embedded in the marginal edge of the material 4, but the surface 20 will prevent cutting of the material. Instead, the gasket 17 will be subjected to further compressive force. That is, the members 6 and 11 will be capable of movement relative to each other so as to secure an effective, airtight seal between the material 4 and the member 1, between the material 4 and the clamp member 11, and between the members 6 and 11. Thereafter, the molding operation may proceed, following which the members 6 and 11 may be raised so as to enable the molded articles to be removed from between the mold members. The process then may be repeated.

The apparatus shown in FIGURE 3 is similar to that previously described except that the material engaging surface of the clamping member 11 comprises two spaced apart, parallel, co-planar, flat ribs 21 and 22 between which is a rectangular channel or groove 23. The operation of the apparatus shown in FIGURE 3 corresponds to that described in connection with the apparatus shown in FIGURE 2.

The embodiment of the invention shown in FIGURE 4 is similar to the embodiment shown in FIGURE 2 but differs from the latter in that a gasket member 17a, similar to the gasket 17, is positioned inboard of the line of bolts 16, and a plurality of compression springs 24 is located outboard of the bolts 16, each spring 24 being accommodated in a recess 25 formed in the member 6.

To condition the apparatus shown in FIGURE 4 for use, the bolts 16 are threaded into the member 6 initially a distance sufficient to compress the gasket 17a and impose a preload on the springs 24, but not a sufficient distance to preclude further movement of the members 6 and 11 toward one another. The gasket 17a thus will be capable of providing an airtight seal between the members 6 and 11 and the springs 24 will permit relative movement between the members 6 and 11 so as to assure proper sealing of the latter with the material 4.

The disclosed embodiments are representative of presently preferred forms of the invention, but are intended to be illustrative rather than definitive thereof. The invention is defined in the claims.

I claim:

1. A mold construction comprising a first member on which material to be molded may be supported; a second member adapted to overlie said first member with said material interposed therebetween; a clamp member carried by one of said members having a plurality of spaced apart substantially coplanar continuous surfaces adapted to engage said material and clamp it tightly against the other of said members; and deformable means interposed between said one of said members and said clamp member for enabling relative movement therebetween.

2. The construction set forth in claim 1 wherein each of said surfaces is flat.

3. The construction set forth in claim 1 wherein each of said surfaces is spaced by a groove in said clamp member.

4. The construction set forth in claim 3 wherein each of said surfaces comprises a relatively sharp edge adapted to be embedded in said material.

5. The construction set forth in claim 4 wherein each of said surfaces is separated by a concave, arcuate groove.

6. The construction set forth in claim 1 wherein said deformable means is relatively incompressible.

7. The construction set forth in claim 6 wherein said material has rubbery properties.

8. The construction set forth in claim 6 wherein said deformable means comprises a yieldable spring.

9. The construction set forth in claim 8 including sealing means interposed between said one of said members and said clamp member.

References Cited

UNITED STATES PATENTS

| | | |
|---|---|---|
| 2,254,376 | 9/1941 | Lyon. |
| 2,694,227 | 11/1954 | Fordyce et al. |
| 2,761,406 | 9/1956 | Schnell. |
| 3,225,387 | 12/1965 | Angilello et al. |
| 3,341,895 | 9/1967 | Shelby. |
| 3,368,245 | 2/1968 | Witkowski. |

J. HOWARD FLINT, JR., *Primary Examiner.*

U.S. Cl. X.R.

18—19